United States Patent Office 3,608,182
Patented Sept. 28, 1971

3,608,182
METHOD OF FORMING ELECTRIC
CABLE SHEATHS
Kenneth Edward Lawrence Hughes, Romsey, and James
Arthur Francis Donelan, Alton, England, assignors to
Pirelli General Cable Works Limited
Filed Apr. 11, 1969, Ser. No. 815,383
Claims priority, application Great Britain, Apr. 17, 1968,
18,084/68
Int. Cl. B23k 1/20, 31/02
U.S. Cl. 29—482
5 Claims

ABSTRACT OF THE DISCLOSURE

A method of forming a radially extending annular flange on a corrugated metal sheath of an electric cable comprises applying axially opposed compressive forces to the opposite side walls of a single corrugation crest of the corrugated sheath, thereby compressing the crest until the opposite side walls contact each other. The single corrugation crest is spaced from the ends of the sheath and lies between adjacent corrugation crests and any tendency of the sheath to shorten as a result of the compression step is balanced by a flattening of the adjacent corrugation crests, which may itself occur during the compression step or be purposefully effected in a pre-compression swaging step. The flange which results from the compression step provides a highly convenient land to which a component, such as a joint end bell, may be welded, the end bell firstly being positioned with an annular flange thereon in abutment with the compressed corrugation crest.

This invention relates to sheaths for electric cables.

The invention has particular, but not exclusive, reference to corrugated metal cable sheaths. Corrugated metal sheaths are widely used in order to provide a sheath having sufficient flexibility to enable the sheathed cable to be wound up on drums and withstand other bending operations during mechanical handling and laying of the cable, in the instance when the sheath metal lacks sufficient inherent flexibility. Corrugation may be necessary in particular when the sheath metal is aluminium but the problem arises also with other sheath metals including copper, stainless steel and various alloys.

When jointing together lengths of sheathed electric cable protected by corrugated metal sheaths, or when securing components, e.g. end terminals, to a cable sheath, soldering/plumbing operations are normally involved. Joints made by these methods have inherent mechanical strength limitations and require considerable skill if good metal-to-metal bonding is to be achieved and porosity weaknesses prevented.

These disadvantages could be obviated by the use of welded joints of similar or dissimilar materials. With welding techniques other than cold-welding substantial heat must necessarily be generated and care has to be taken to avoid damage being caused to the cable core from the welding heat source; there is also the risk of the sheath metal being melted through and allowing the escape of oil or filling compound which may interfere with the welding operation. Even in an electric cable having a corrugated metal sheath the valleys of the corrugations will normally lie close to the surface of the cable core, or even be in contact with the same and damage to the cable core could, therefore, result.

A main object of the present invention is to provide a method of forming a radially extending annular flange in a metal cable sheath so as to facilitate subsequent jointing or welding operations.

Accordingly the present invention provides a method of forming a radially extending annular flange in a metal cable sheath comprising engaging two spaced apart circumferential regions of the sheath and applying axially opposed compressive forces to the sheath in said regions to cause radially outward plastic deformation of the portion of the sheath between said regions so as to form an annular radial flange projecting outwardly from the sheath.

The resulting radial flange provides a projecting land on which a joint can be more easily made. In the case of oil filled cables in particular, joint end bells can be welded to the flange before cutting the cable, thereby avoiding an outflow of oil which would otherwise interfere with the welding operation.

Preferably sufficient deformation of the portion of the sheath between said regions is effected to bring portions of the sheath wall into sealing abutment with each other in the radially inner part of the resulting flange. An annular seal can therefore be created, isolating the presurized interior of the cable sheath, as for example when the cable is oil-filled, from the welding zone.

As stated above, the invention is particularly applicable to corrugated sheaths: the axially opposed compressive forces are then preferably applied to a pair of sheath wall regions on opposite sides of a corrugation crest.

Apparatus according to the invention for forming a radially extending annular flange in a cable sheath includes two annular tools adapted to engage two spaced apart circumferential regions of the sheath and means for moving said tools relatively towards each other along the sheath axis to cause radially outward plastic deformation of the portion of the sheath between said regions so as to form between the tools an annular radial flange projecting outwardly from the sheath.

Preferably the inner surface profile of the annular tools is complementary to the respective sheath regions engaged thereby. For example, where the sheath is corrugated the inner surface profile of the clamps may be complementary to that of adjacent corrugation roots so as to provide a broad area of contact. In this way the clamps can act as thermal sinks during subsequent welding operations on the flange, and can also provide a positive location for mechanised welding equipment. More than one pair of tools or clamps may be used in succession to effect successive deformations forming said flanges and, if desired, a metal-to-metal seal between portions of the sheath in the radially inner part of the flange.

Any suitable means may be used for producing the necessary axially opposed compressive forces on the sheath as will be clear to those skilled in the art.

The present invention also includes a cable sheath formed with a radial flange by the above-defined method, and an electric cable having such a sheath both per se and when jointed to similar cables or to other components.

The invention is illustrated by way of example in the accompanying drawings, in which.

Figure 1:
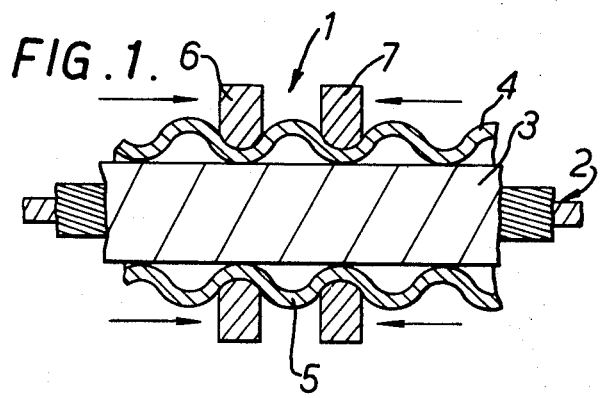
FIG. 1 is a diagrammatic axial section through a cable having a corrugated metal sheath with two deforming tools in position prior to deformation of the sheath by the method of the invention.

FIG. 1 shows part of an electric cable 1 having a core 2, insulation 3 and a corrugated metal sheath 4. The sheath 4 contacts the cable insulation 3 at valleys in the sheath corrugations.

In order to weld a component such as a joint end bell to the cable sheath 4 without causing damage by heat to the underlying insulation 3, the sheath 4 is formed with a radially extending annular flange. This is effected by engaging two adjacent circumferential regions of the sheath wall converging towards a corrugation crest 5 by means of two respective split annular metal deforming tools 6, 7. Each tool 6, 7 has an inner surface profile which is complementary to the surface of the sheath 4 at the regions engaged by the tools, that is, in this embodiment, at adjacent corrugation valleys.

The tools 6, 7 are mounted in any suitable apparatus (not shown) for effecting relative axial movement of the tools towards each other as indicated by the arrows in FIG. 1. Movement of the tools 6, 7 towards each other causes radially outward plastic deformation or upsetting of the intervening crest 5, so as to form a double-sided, hollow radially extending annular flange 8 (FIG. 2).

Figure 3:
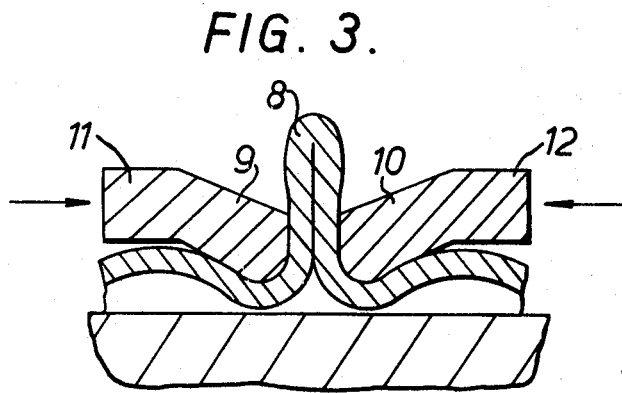
FIG. 3 is an axial section on an enlarged scale of part of the cable sheath after formation of an annular flange, illustrating a subsequent sealing operation.

If it is desired subsequently to weld a component to the flange 8 is preferably located between a pair of jaws 9, 10 of two annular clamps 11, 12 (FIG. 3). The jaws 9, 10 are inclined inwardly towards the sheath axis and engage an annular region of the flange 8 at the radially inner part thereof. Upon moving the clamps 11, 12 axially towards each other the two abutting portions of the sheath wall forming the radially inner part of the flange 8 are pressed into sealing engagement, mating to form an annular seal which isolates the radially outer part of the flange 8 from the interior of the sheath. A component can then be welded to the said outer part of the flange 8 and if, in the course of such welding, the sheath wall in said outer flange part is punctured, escape of oil from the pressurised sheath interior is prevented by said seal.

During the welding step the jaws 9, 10 are held in their clamping position and act as a heat sink conducting away the welding heat. The clamps 11, 12 also assist in positively locating the welding equipment.

Figure 2:
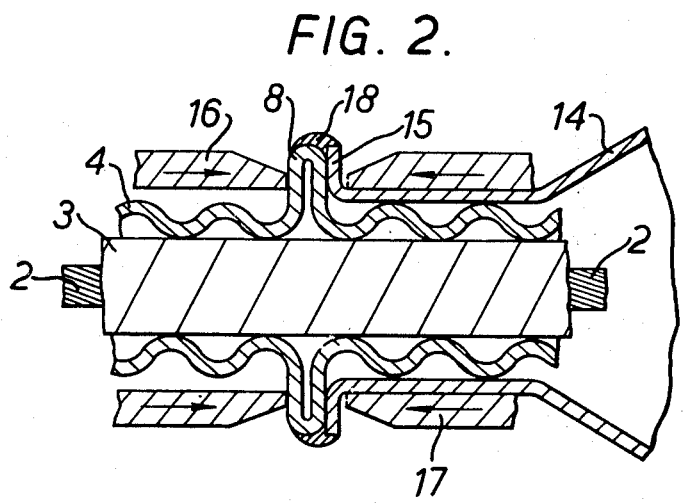
FIG. 2 is an axial section of the cable of FIG. 1 after formation of a radial flange in the cable sheath, illustrating a subsequent welding operation.

FIG. 2 illustrates a typical welding operation upon a hollow annular flange 8 formed by the method of the invention. A component 14 such as an end sealing bell having a flange 15 is placed over the end of the cable with the flange 15 in face-to-face abutment with the radially outer part of the flange 8 on the sheath 4. The two flanges 8, 15 are held together by axially movable clamps 16, 17 which also serve as heat sinks for conducting away the welding heat, a continuous weld 18 being effected at the outer edges of the abutting flanges 8, 15.

The method of the invention is illustrated in FIGS. 1 to 3 as applied to a cable sheath 4 having annular corrugations. Such annular corrugations may be formed by the apparatus according to our copending application No. 1,266/68. It will be appreciated, however, that the invention is also applicable to cable sheaths having helical corrugations, formed, for example, by means of apparatus according to our earlier specification No. 791,514, or to straight-sided cable sheaths.

In general, the upsetting or deformation of the cable sheath to form the radial flange 8 will tend to cause a shortening of the sheath. Such shortening can be avoided in the case of a corrugated sheath by swaging down at least some of the corrugations adjacent the site of the flange.

Figure 4A:
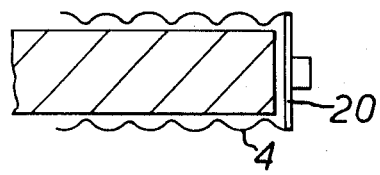
FIGS. 4A, 4B and 4C show diagrammatic axial sections of a cut end of a sheathed cable, illustrating successive steps in the formation of a radial flange in the cable sheath.
Figure 4B:
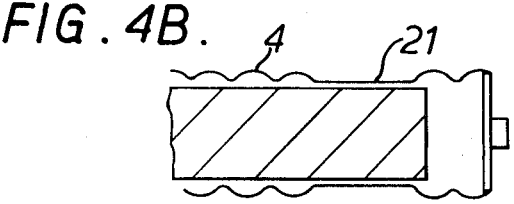
Figure 4C:
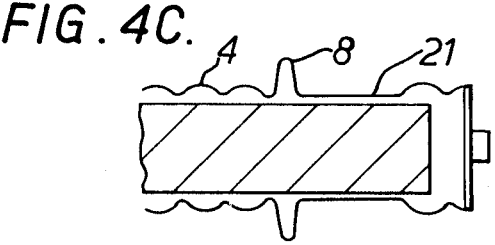

FIGS. 4A to 4C illustrate successive steps in the formation of a flange 8 on the end of an annularly corrugated cable sheath 4. FIG. 4A shows the cable sheath 4 initially, provided at its end with a temporary disc type end seal 20. A portion of the sheath 4 near the end seal 20 is swaged down to remove the corrugations over a portion 21 of short length (dependent on the size of the flange 8 to be formed), thereby increasing the length of the sheath 4 at said end (FIG. 4B). The swaged-down portion 21 of the sheath 4 is then deformed or upset radially to form the flange 8 (FIG. 4C). After effecting any welding operation on the flange 8 the cable sheath 4 is cut in the portion 21 close to the flange 8.

Figure 5:
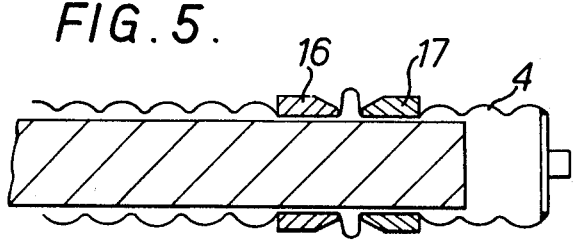
FIG. 5 is a diagrammatic axial section of a cable having a corrugated metal sheath formed with a radial flange by the method of the invention.

Swaging-down of the corrugations of the sheath 4 may also be effected on each side of a selected corrugation 5 to be deformed, so as to facilitate access of the clamps 16, 17 for effecting a seal, as illustrated in FIG. 5.

Figure 6:
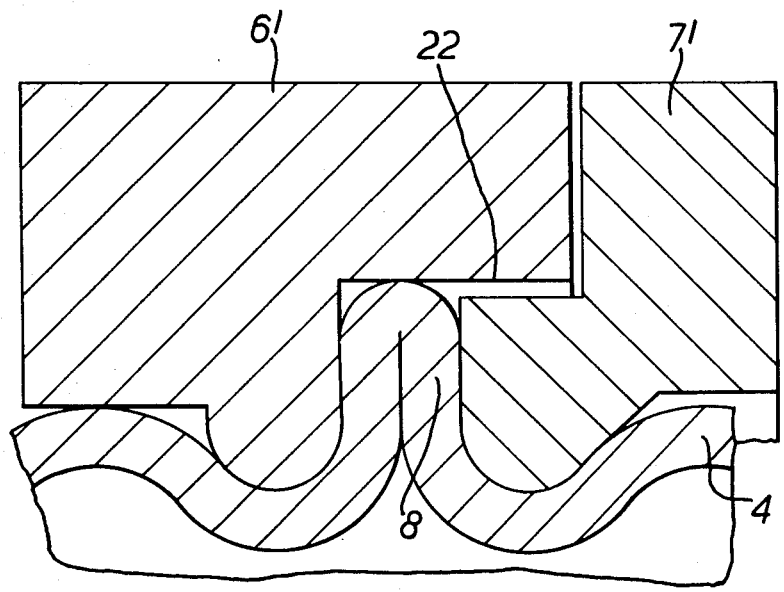
FIG. 6 is an enlarged sectional view of part of a cable sheath and a pair of deforming tools according to an alternative embodiment of the invention.

To ensure uniformity of the size of the flange 8, and to determine the final diameter thereof, the deforming or upsetting tools may be specially shaped, as shown in FIG. 6 at 6', 7'. One of the tools, 6', overlaps the other and is formed with an outer cylindrical surface 22 which limits the radially outward deformation of the upset sheath portion forming the flange 8. This facilitates accurate matching of the flange 8 to a component, such as a joint sleeve or end bell, to be secured thereto.

Figure 7:
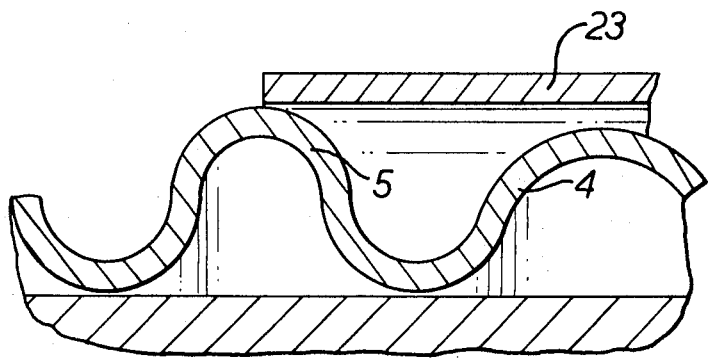
FIG. 7 is a diagrammatic axial section of part of a cable sheath illustrating deformation of the sheath into engagement with a surrounding sleeve by the method of the invention.

FIG. 7 illustrates part of a cable sheath 4 having a maximum (i.e. crest) diameter which is slightly less than that of a sleeve 23 to which the sheath is to be joined, the sleeve 23 forming, for example, part of a joint casing. In this case the sleeve 23 is place around the sheath 4 and a selected corrugation 5 in the latter is upset by axial compression to form a slightly protruding flange which contacts the internal surface of the sleeve 23. Welding is then carried out at the abutting surfaces of the sheath 4 and sleeve 23.

The present invention is of particular applicability to the welding of corrugated sheaths of aluminium, on account of the economic desirability of that metal for cable sheathing and the high temperatures required for welding of the same.

We claim:

1. A method of forming a radially extended annular flange on a corrugated metal sheath of a cable, comprising the step of applying axially opposed compressive forces to the opposite side walls of a single corrugation crest of said corrugated metal sheath and thereby axially compressing said corrugation crest until said opposite side walls contact each other, said corrugation crest being spaced from the ends of said sheath and lying between adjacent corrugation crests, whilst balancing any tendency of the sheath to be shortened as a result of said compression with a flattening of the adjacent corrugation crests.

2. A method as claimed in claim 1, further comprising a subsequent step of applying further axially opposed compressive forces to said compressed corrugation crest only at radially inner regions thereof and thereby bringing said opposite side walls of said corrugation crest into sealing abutment over said radially inner regions.

3. A method as claimed in claim 1, further comprising the step, before said compression step, of swaging several corrugation crests adjacent said single corrugation crest and thereby flatten said adjacent corrugation crests to balance any tendency for said sheath to shorten as a result of said compression step.

4. A method as claimed in claim 1, further comprising the step, before said compresion step, of positioning a cylindrical metal sleeve of a joint or termination component around said single corrugation crest and, during said compression step, compressing said corrugation crest as aforesaid and thereby radially outwardly expanding said corrugation crest and bringing said corrugation crest into abutment with the inner surface of said sleeve and thereafter welding said sleeve and crest to each other.

5. A method as claimed in claim 1, further comprising the step of positioning a cable joint end bell around said cable sheath with an annular flange on said end bell abutting the compressed said single corrugation crest, clamping together said abutting flange and corrugation crest and thereafter welding said flange and crest to each other.

References Cited

UNITED STATES PATENTS

| | | | |
|---|---|---|---|
| 2,965,961 | 12/1960 | Schindler | 72—59 |
| 3,023,496 | 3/1962 | Millar | 29—482X |
| 3,156,029 | 11/1964 | Simon | 29—25.19X |
| 3,203,083 | 8/1965 | Obenhaus | 29—482X |
| 3,374,529 | 3/1968 | Osborn et al. | 29—482 |

FOREIGN PATENTS

| | | | |
|---|---|---|---|
| 1,051,547 | 12/1951 | France | 72—59 |

JOHN F. CAMPBELL, Primary Examiner

R. B. LAZARUS, Assistant Examiner

U.S. Cl. X.R.

29—475; 72—367